Sept. 6, 1955     N. F. ARONE     2,717,216
FLAME-RETARDANT INSULATED CONDUCTORS METHOD
OF MAKING SAME AND COMPOSITIONS
USED TO PREPARE THE SAME
Filed July 1, 1954
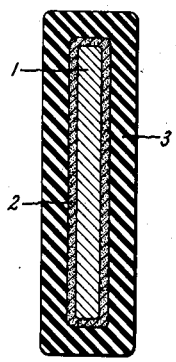
Inventor:
Nicholas F. Arone,
by J. Wesley Haubner
His Attorney.

United States Patent Office 2,717,216
Patented Sept. 6, 1955

2,717,216

FLAME-RETARDANT INSULATED CONDUCTORS, METHOD OF MAKING SAME, AND COMPOSITIONS USED TO PREPARE THE SAME

Nicholas F. Arone, Upper Darby, Pa., assignor to General Electric Company, a corporation of New York Application July 1, 1954, Serial No. 440,784

8 Claims. (Cl. 117—75)

This invention is concerned with modified ethoxyline resins having improved heat resistance and electrical properties. More particularly, the invention relates to modified ethoxyline resins having improved heat resistance and flame retardancy, as well as improved electrical properties, said composition comprising a mixture of ingredients composed of an ethoxyline resin, a vinyl chloride resin, a specific plasticizer for the vinyl chloride resin, namely, di-(2-ethylbutyl) phthalate, and antimony trioxide. The invention also includes improved electrical conductors insulated with the aforesaid composition.

In the preparation of insulated conductors, and in particular insulated bus bars which are designed for use in high voltage circuits, the present procedure has been to insulate these bus bars with laminated sheets of paper bonded by such binders as, for instance, shellac, phenol-formaldehyde resinous condensation products, etc. However, these materials have not been entirely satisfactory due to the fact that their heat resistance at temperatures of 100° to 125° C. decreases with an accompanying increase in 60 cycle power factor or 60 cycle dissipation factor. Attempts have been made in the past to obviate these effects by the use of other types of insulation for the bus bars, but for the most part these attempts have not been too successful.

I have now discovered that a new type of insulation can be readily adapted and employed in connection with the insulation of bus bars, and such insulation can operate almost continuously at 100° C., and as high as 200° C. for intermittent periods of time without deterioration in physical properties, particularly distortion properties. Moreover, this insulation has better power factor and dissipation factor at both room temperature and at elevated temperatures (100° C.) than has heretofore been obtainable with previous insulations for the bus bars. Finally, this improved insulation of my invention is readily adaptable for more economic molding techniques involving simpler and less expensive handling procedures than have heretofore been used, by virtue of the fact that my insulating composition in the pre-cured state is pourable at room temperature, making it readily adaptable for casting purposes. The curable insulation can also be thickened somewhat with thickening fillers so that it can be employed in injection molding and extrusion apparatus with good results.

Accordingly, it is one of the objects of this invention to prepare insulated conductors, e. g., insulated bus bars, which can be operated continuously at 100° C. and intermittently at 200° C.

Another object of the invention is to prepare insulated electrical conductors which exhibit good electrical properties at either room temperature or elevated temperatures as high as 100° C.

A still further object of the invention is concerned with the preparation of insulating compositions which are readily amenable to casting and extrusion molding operations.

A further object of the invention is the preparation of insulated conductors in which the insulation is flame retardant and at temperatures of 100° C. or somewhat higher, is substantially rigid and non-softening.

Other objects of the invention will become more apparent from the discussion which is found below.

In carrying out my invention in one form, I employ as insulation for electrical conductors, such as electrical bus bars, etc., a mixture of ingredients comprising a complex epoxide resin composed of a polyether derivative of a polyhydric organic compound, e. g., a polyhydric alcohol or phenol containing epoxy groups (which, for brevity, will hereinafter be referred to as "ethoxyline resin"), a vinyl chloride resin, a specific plasticizer for the vinyl chloride resin, namely, di-(2-ethylbutyl) phthalate, and antimony trioxide (Sb$_2$O$_3$), together with a suitable curing agent for the ethoxyline resin.

The ethoxyline resins defined above as being a complex epoxide resin comprising a polyether derivative of a polyhydric organic compound containing epoxy groups are disclosed in various places in the art. Among such references may be mentioned Castan Patents 2,324,483 and 2,444,333, and British Patents 518,057, and 579,698. For the most part, these ethoxyline resins are based on the resinous product of reaction between an epihalogeno-hydrin, for instance, epichlorohydin, and a polyhydric alcohol such as glycerine or a phenol having at least two phenolic hydroxy groups, for example, bis-(4-hydroxyphenyl) dimethylmethane. U. S. Patents 2,494,295; 2,500,600 and 2,511,913 also described examples of ethoxyline resinous compositions which may be employed in the practice of the present invention. By reference, all the aforementioned patents are intended to be part of the present description of the ethoxyline resins used and, for brevity, the ethoxyline resins will not be described other than that they contain more than one ethylene oxide group; e. g., from 1 to 2 or more epoxide groups, per molecule, and may be prepared by effecting reaction between a polyhydric phenol or alcohol, for example, dihydric alcohol (e. g., ethylene glycol, triethylene glycol, etc.) phenol, hydroquinone, resorcinol, glycerine, erythritol, pentaerythritol, sorbitol, etc., and condensation products of phenols with ketones, for instance, bis-(4-hydroxylphenyl)-2,2-propane, with epichlorohydrin. For example, the reaction of epichlorohydrin with bis-(4-hydroxylphenyl)-2,2-propane may be formulated as follows:

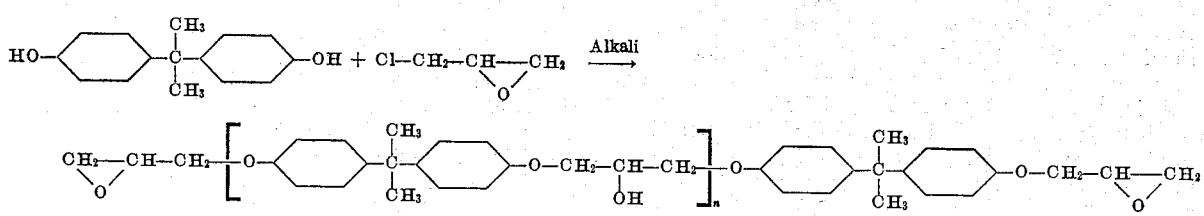

where $n$ has an average value varying from around zero to about 7. Many of these ethoxyline resins are sold under the name of Epon resins by Shell Chemical Corporation, or Araldite resins by the Ciba Company. Data on the Epon resins are given in the table below:

TABLE I

| Epon No. | Epoxide Equivalent | Approximate Esterification Equivalent | M. P., °C. |
| --- | --- | --- | --- |
| RN-34 | 225–290 | 105 | 20–48 |
| RN-828 (forming RN-48) | 192 | 80 | 9 |
| 1064 | 300–374 | 105 | 40–45 |
| 1062 | 140–165 | | Liquid |
| 1001 | 450–525 | 130 | 64–76 |

The complex epoxides used in the practice of the present invention contain epoxide groups or epoxide and hydroxyl groups as their functional groups and are generally free from other functional groups such as basic and acidic groups.

In the practice of this invention, the ethoxyline resins are preferably those which are liquid at room temperature or which can be made liquid by the slight application of heat, either directly or by virtue of the fact that mixing of the ethoxyline resin with the vinyl chloride resin will generate sufficient heat to effect fusion of the ethoxyline resin.

Among the solid vinyl chloride resins which may be employed in the practice of the present invention are, for instance, polyvinyl chloride, vinyl resins produced by the conjoint polymerization of vinyl chloride and a vinyl ester of of a lower saturated aliphatic monocarboxylic acid, e. g., vinyl formate, vinyl acetate (such vinyl chloride-vinyl acetate copolymers being available under the trade name of "Vinylite" resins wherein the vinyl chloride component is present in a preponderant amount, for instance, from about 75 to 99.5 per cent of the total weight of the latter and the vinyl acetate), vinyl propionate, vinyl butyrate, vinyl hexoate, etc.; the term "lower saturated aliphatic monocarboxylic acid" embracing those containing at most six carbon atoms. Copolymers of vinyl chloride and vinylidene chloride, as well as copolymers of vinyl chloride with copolymerizable esters such as methyl methacrylate, ethyl methacrylate, methylchloroacrylate, etc., are also intended to be included within the scope of the present invention. For optimum flame retardance and fire resistance, polyvinyl chloride (of molecular weight ranging from 50,000 to 150,000) and copolymers of vinyl chloride and vinyl acetate, where the vinyl chloride comprises at least 90 per cent of the total weight of the latter two ingredients, are preferred.

The plasticizer employed in combination with the vinyl chloride resin is critical. For optimum electrical properties, and for the best heat resistance, it is essential that one employ di-(2-ethylbutyl) phthalate as the plasticizer. The criticality of the plasticizer is evidenced by the fact that when one employs, for instance, equivalent amounts of dibutyl phthalate or di-(2-ethylhexyl) phthalate as the plasticizer in the insulation herein described for electrical conductors such as bus bars, the dissipation factor of such insulations is well in excess of 50 per cent at 100° C. and well beyond the measurement range of the equipment designed to measure dissipation factor. Even the use of a plasticizer, such as diisobutyl phthalate, again gives a dissipation factor well in excess of 50 per cent at 100° C.

Although the combination of ingredients composed of the ethoxyline resin, the vinyl chloride resin, and the di-(2-ethylbutyl)phthalate (for brevity hereinafter referred to as "dihexyl phthalate") has good heat resistance, nevertheless, at elevated temperatures of about 100° C. or higher, it is found that the insulation tends to soften and weaken, thus failing to give the necessary rigidity for insulated conductors, particularly insulated bus bars. Unexpectedly, I have found that the incorporation of a small amount of antimony trioxide in the insulation stiffens the insulation at elevated temperature of 100° C. without undesirably affecting the electrical properties of the latter. The amount of antimony oxide employed is relatively small and is preferably equal to from 3 to 10 per cent, by weight, based on the weight of the ethoxyline resin.

A still further critical feature of the present invention is the particular catalyst or curing agent employed in combination with the insulation, in order to effect curing of the ethoxyline resin. Unexpectedly, it has been found that many of the usual types of amine catalysts used with ethoxyline resins are either ineffective for causing cure of these resins in the presence of the other ingredients contained in the insulation, or else the cure induced by the use of such amine type catalysts is poor and unsatisfactory, especially at elevated temperatures where it is noted that some of the cured materials tend to degrade or depolymerize. The use of acidic catalysts, such as dicarboxylic acids or anhydrides described in the above-mentioned Castan Patent 2,324,483, is completely unsatisfactory because of the poor electrical properties resulting from the use of such catalysts.

I have found that the best results are obtained when one employs as the catalyst either one of the following, alone or in combination with each other, namely, m-phenylene diamine, diethylenetriamine, or aminoethylethanolamine. The preferred catalysts are the m-phenylene diamine and diethylenetriamine. The use of the aminoethylethanolamine, although satisfactory in most respects, does not give low enough dissipation factors at elevated temperatures. Both the m-phenylene diamine and diethylenetriamine give exceedingly good cures in the final insulation, and also impart improved heat stability at elevated temperatures to the cured insulation. The m-phenylene diamine is able to impart a longer shelf life to the curable insulation, while the diethylenetriamine has the advantage over the m-phenylene diamine in that, being a liquid, it enables one to prepare lower viscosity materials than when using the m-phenylene diamine which is a solid, a property which tends to increase the viscosity of the curable insulation.

The usual types of amine catalysts employed in combination with ethoxyline resins, for instance, piperidine or pyridine, although they may effect initial cure of the insulation containing the ethoxyline resin and the vinyl chloride resin, nevertheless at temperatures around 170° C., the presence of these curing agents causes degradation of the insulation to a point where the insulation actually reverts to a liquid. Unexpectedly, the employment of the above-described preferred three amine type catalysts does not result in any such degradation and, for all apparent purposes, there is no depolymerization or degradation.

I have found that when employing the m-phenyl diamine, it is desirable to dissolve the latter because of its solid state, in a suitable solvent therefor which is compatible with the ethoxyline resin, and preferably is one which is polymerizable at elevated temperatures. For this purpose, I have advantageously used materials such as diallyl phthalate, which additionally acts as a vulcanizable or curable plasticizer for the vinyl chloride resin. Other polymerizable materials compatible with the ethoxyline resin which cure readily under the influence of heat to the substantially insoluble and infusible state which can also be used are, for instance, tetraethylene glycol dimethacrylate, divinyl benzene, etc. When dissolving the amine catalyst in the aforesaid liquid solvents therefor, I have found that one may advantageously use approximately equal weights of the solvent and the amine catalyst, although larger or smaller amounts may be employed without harmful effects.

The amount of amine catalyst, namely, the diethylene triamine or m-phenylene diamine, used for curing purposes, is also critical. For optimum results, I employ from 7 to 12 percent, by weight, of either catalyst, based on the weight of the ethoxyline resin. Amounts in excess of this upper range cause undesirable increases in the dissipation factor of the cured insulation at elevated temperatures, while amounts of the amine catalyst below 7 per cent will give unsatisfactory cures of the resin.

Since it is desirable that the insulation described in the present invention, particularly in combination with bus bars, also be flame resistant and flame retardant, I have found that one may also use within certain specified ranges other plasticizers for the vinyl chloride resin for this specific purpose, particularly tricresyl phosphate. These latter plasticizers are advantageously present in an amount equal to from about 4 to 15 per cent, by weight, based on the weight of the vinyl chloride resin. It should be noted that when one employs, for instance, tricresyl phosphate as a complete substitution (or as a substantial substitution) for the di-(2-ethylbutyl) phthalate, one will find that the dissipation factor at elevated temperatures increases markedly to a point where it is completely unsatisfactory. In addition, when employing tricresyl phosphate in place of the dihexyl phthalate, the viscosity of the uncured insulating material is much too high for casting purposes.

A range of ingredients which I have found eminently suitable for insulating high-voltage equipment and conductors comprises the following ingredients in the stipulated parts by weight:

| Ingredient: | Parts by weight |
| --- | --- |
| Ethoxyline resin | 100 |
| Vinyl chloride resin | 80–120 |
| Di-(2-ethylbutyl) phthalate | 8–50 |
| Antimony trioxide | 3–10 |
| Amine catalyst | 7–12 |
| Tricresyl phosphate (if used)[1] | Up to 15 |

[1] E. g., from 5 to 15.

It should be noted that when one employs the amine catalyst, particularly an amine catalyst such as m-phenyl diamine (which is a solid at room temperature) in combination with a solvent therefor, such as diallyl phthalate, which is also a plasticizer for the vinyl chloride resin, suitable provision should be made for reduction in the amount of the dihexyl phthalate plasticizer for the vinyl chloride resin. Generally, the amounts of the vulcanizable plasticizer used as solvent for the amine catalyst are relatively small and do not require too critical rearrangement of the proportion of the ingredients in the insulation.

In preparing insulating compositions herein described to be used for high-temperature insulation purposes, the procedure employed is advantageously as follows:

Generally, the liquid ethoxyline resin is mixed with all the solid ingredients in the insulation, for instance, the polyvinyl chloride (or other vinyl chloride resin), antimony trioxide, etc., for a sufficient length of time to obtain a good dispersion of the solid materials in the liquid materials. For this purpose, one may use a sigma blade mixer, and mixing times of the order of about 2 to 4 hours are advantageously employed. Thereafter, the plasticizer for the vinyl chloride resin is incorporated in the above-described dispersion and additional mixing employed to intimately disperse the plasticizer. The amine catalyst (either alone or in the form of a suitable solution thereof) is then added, and if the above-described insulation is to be employed for casting purposes, a high vacuum is applied to the liquid casting material in order to remove as much of the air as is possible from the mixture of ingredients. After this, the liquid casting material can be used for potting purposes or can be poured into molds containing bus bars suitably positioned in the molds, whereby satisfactory encapsulation of the bus bar is effected. Thereafter, the casting is permitted to remain in air for a preliminary air cure for about 30 minutes to several hours, and then baked at 150° C. for about 1 to 2 hours to complete the cure. Obviously, the curing cycle may be varied widely, depending upon such factors as the type of insulation employed, the application involved, etc. By increasing the solids content of the insulation so as to obtain a more putty-like material, there may be obtained insulating compositions readily adaptable for extrusion molding.

With particular reference to the insulating of bus bars, I have found that although the cast or extruded insulation around a bus bar may be tightly adherent and thus afford good protection either heat-wise or electrically, improved results and better assurance of maintaining the improved electrical characteristics of the insulation are obtained if one coats the bus bar with a conducting paint prior to casting the insulation around the conductor. Unexpectedly, it has been found that by coating the bus bar and curing the conducting paint prior to insulating the same with the compositions defined in the present invention, there is a transfer of the resinous conducting film from the bus bar to the inner side of the cured insulation immediately adjacent the bus bar. By means of this tightly adherent conducting film on the insulation, any portions of the insulation which might separate from direct contact with the bus bar will have bonded thereto a conducting surface at the same potential as the bus bar, whereby undesirable electrical losses, such as high voltage and corona discharge, are minimized or eliminated.

These conducting films (high resistance conducting paints may also be employed) may be composed of phenolic resins containing conducting materials of finely divided size, for instance, colloidal carbon, graphite, various metals such as finely divided copper, iron, etc. In addition, the binder for the conducting and semi-conducting materials may be other resinous compositions, as, for instance, alkyd resins (which comprise reaction products of a polyhydric alcohol and a polybasic acid), cellulose acetate, etc. The presence of this transferred conducting or semi-conducting film on the inner surface of the insulation of the bus bar provides a convenient means for controlling the distribution of voltage and voltage stresses throughout the insulation, so that higher effective dielectric strengths and creepage values may be realized; in addition, it eliminates corona which, when present, causes undesirable deterioration of the insulation.

Generally, it is only necessary to paint the bus bar with the conducting resin, allow it to air-dry, and thereafter insulate it with the insulating modified ethoxyline compositions described in the present application. If desired, the conducting film may be heated at temperatures sufficient to effect curing of the binder, if heat-curable resinous binders are employed. Very often it is only necessary to air-dry the film, since in the step of a heat-curing the insulation around the bus bar, the latter step will also be sufficient to cure the conducting resinous film and at the same time effect transfer of the film to the inner side of the insulation.

The following Fig. 1 shows a typical bus bar in which the conducting electrical core 1 is surrounded with a layer of conducting paint 2, and an outer insulation 3 composed of the complex epoxide resin, the vinyl chloride resin, the di-(2-ethylbutyl) phthalate, and antimony trioxide, cured to the final desired state of condensation by means of a suitable amine catalyst and, having incorporated therein for enhanced flame resistance, such materials as tricresyl phosphate.

In order that those skilled in the art may better understand how the present invention may be practiced, the following examples are given by way of illustration and not by way of limitation. All parts are by weight.

*Example 1*

100 parts of an ethoxyline resin, manufactured by Shell Chemical Corporation (identified as Epon No. 828) and 100 parts of solid polyvinyl chloride (manufactured by The Naugatuck Chemical Company as Marvinol VR-10), together with 5 parts antimony trioxide were intimately mixed for about 3 to 4 hours in a sigma blade mixture until a good dispersion was obtained. This yielded a product which was quite flowable at room temperature and suitable for casting purposes. Thereafter, 50 arts di-(2-ethylbutyl) phthalate were added and the mixing continued for about 5 to 10 minutes. This mixture of ingredients was then removed from the mixer and about 10 parts diethylene triamine added and intimately dispersed therein. The entire casting material was subjected to a vacuum to remove any trapped air as a result of the mixing, so as to give a void-free insulation. Discs were cast from this material in molds 5 inches in diameter and 3/16 inch thick by placing the liquid resinous mixture in the mold, allowing it to stand at room temperature for about 1 hour, and thereafter baking the resinous mixture at 150° C. for about 1 to 2 hours. Samples were then tested for dissipation factor in accordance with ASTM D150-47T, as well as for other electrical properties. In addition, the physical properties of this cast sample were also determined. These tests showed that the dissipation factor at room temperature (about 26° C.) ranged from about 5 to 7 per cent, and the dissipation factor at 100° C. was between 30 and 40 per cent. The dielectric strength was about 250-300 volts/mil. Even after boiling the sample for three weeks in water and thereafter removing the sample from the water and removing the excess moisture from the surface, it resulted in a dissipation factor at room temperature of only 5 to 7 per cent. The impact strength was 1.48 ft. lb. Izod per inch of notch, the flexural strength was 7576 p. s. i., and the tensile strength was 4210 p. s. i. Even after heating the sample for 24 hours at 125° C., the tensile strength was still of the order of about 4060 p. s. i. One of the unexpected features of this type of insulation is the fact that the dissipation factor after 100 per cent relative humidity plus dew at about 46° C. was still only 5 to 7 per cent.

In contrast to the above results, when the usual paper insulation for bus bars bonded by shellac into a homogeneous product was tested for dissipation factor, it was found that at room temperature this dissipation factor was 2 to 3 per cent, while at 100° C. it was about 19 to 25 per cent. However, after 24 hours at 100 per cent relative humidity plus dew, the dissipation factor at about 46° C. was well above 50 per cent, and beyond the ability of the testing equipment to measure the dissipation factor. The impact strength was relatively low, of the order of about 0.6 to 0.7 ft. lb. per inch of notch (Izod).

*Example 2*

In this example, a liquid resinous mixture suitable for casting purposes was prepared from 100 parts Epon resin No. 828, 100 parts polyvinyl chloride Marvinol VR-10, 5 parts antimony trioxide, 10 parts di-(2-ethylbutyl) phthalate, and 10 parts tricresyl phosphate. To this mixture of ingredients were added 20 parts of a mixture of m-phenylene diamine and diallyl phthalate present in equal parts, by weight. Employing the same procedure for mixing the ingredients as described in Example 1, this resinous composition was then cast into disks suitable for testing, in the same manner as described in the foregoing Example 1. Tests conducted on these samples showed that the dissipation factor at room temperature was 2.5 per cent, while at 100° C. it was 7 percent. When tricresyl phosphate was substituted for all the di-(2-ethylbutyl) phthalate, it was found that the dissipation factor at 100° C. was well above 50 per cent and outside the range of the testing equipment.

A bus bar was insulated with the composition described in Example 2, by first coating the bus bar with a thin film of a phenol-formaldehyde resinous condensation product containing colloidal graphite as a filler therein. After permitting the conducting film on the bus bar to air-dry, the bus bar was placed in a mold with the two ends exposed and adequately gasketed to permit casting of insulation composed of the composition described in Example 2 around the bus bar (thickness of insulation was about ¼ inch). After the resinous composition of Example 2 had been poured into the mold around the bus bar, it was allowed to air dry and cure in the same manner and under the same conditions as described in Example 1 to give a hard, adherent insulation for the bus bar. The insulation was extremely flame-resistant and flame-retardant. The dissipation factor was at most 5 to 7 per cent, even at temperatures of 100° C. This insulated bus bar could be heated at temperatures of about 150° to 200° C. without any apparent degrading of the insulation and without any undesirable softening of the insulation. The omission of antimony trioxide gave a product which, although having good dissipation factor, nevertheless resulted in undesirable softening of the insulation at temperatures of around 100° to 150° C., so that as an insulating medium the material was unsatisfactory.

The criticality of using only specific types of catalysts is shown by the fact that other amine catalysts similar to the m-phenylene diamine, for instance, o-phenylene diamine or p-phenylene diamine, were either insoluble in the mixture of resinous ingredients or else did not effect a satisfactory cure of the resinous mixture.

*Example 3*

This example illustrates the marked improvement in hardness and rigidity obtained in the compositions described in the instant invention by the use of the antimony trioxide. For this purpose, a mixture of ingredients was prepared similarly as was done in Example 2 consisting of 100 parts Epon resin No. 828, 100 parts polyvinyl chloride (Marvinol VR-10), 5 parts antimony trioxide, 10 parts di-(2-ethylbutyl) phthalate, 10 parts tricresyl phosphate, and 20 parts of an equal weight mixture of diallyl phthalate, and m-phenylene diamine. Another mixture was prepared identical to the above with the exception that the antimony trioxide was omitted. Each mixture of ingredients was thereafter cast around a bus bar in the same manner as described in Example 2 employing the identical casting and curing conditions recited in the latter example. Thereafter, the durometer hardness of each surface of cured, insulated conductor was tested (on the Shore A scale) at various surface temperatures, i. e., on the outer insulating surface, the results of such tests being shown in the following Table II:

TABLE II

| Shore A Hardness | Surface Temperature | | | | | |
|---|---|---|---|---|---|---|
| | 100° C. | 110° C. | 120° C. | 130° C. | 140° C. | 150° C. |
| With Sb₂O₃ | 100 | 96 | 91 | 84 | 81 | 78 |
| Without Sb₂O₃ | 85 | 80 | 76 | 74 | 72 | 72 |

The results in the above table clearly show the marked and unexpected stiffening and hardening effects induced by the presence of even a small amount of antimony trioxide in the insulating composition.

It will, of course, be apparent to those skilled in the art that in addition to the proportion of ingredients described previously, other proportions of ingredients within the range recited above may be used without departing from the scope of the invention. In addition, other suitable curing agents for the epoxide resin may be employed, provided that the curing agent satisfies the following requirements: (1) is not exothermic at room temperature, (2) readily cures the epoxide resin in the presence of the other ingredients to a hard, substantially infusible and insoluble state, and (3) does not cause degradation of the cured insulation at elevated temperatures of around 150 to 200° C., where intermittent operation of the insulated conductor may occur.

In addition to insulating copper cores, other conducting cores such as aluminum, alloys of copper, alloys of aluminum, etc., may also be employed. The shape or size of the bus bars specifically described in the present invention may be varied, depending on the application or high-voltage apparatus in which it will be employed.

What I claim as new and desire to secure by Letters Patent of the United States is:

1. An insulated conductor containing as insulation therefor a mixture of ingredients cured in the presence of a suitable curing agent under the influence of heat and comprising, by weight, (1) 100 parts of a complex epoxide resin having a melting point below 76° C. and comprising a polyether derivative of a polyhydric organic compound containing epoxy groups, (2) from 80 to 120 parts of a vinyl chloride resin selected from the class consisting of polyvinyl chloride and copolymers of vinyl chloride and vinyl acetate, (3) from 8 to 50 parts di-(2-ethylbutyl) phthalate, and (4) from 3 to 10 parts antimony trioxide.

2. An insulated conductor containing as insulation therefor a mixture of ingredients cured under the influence of heat and comprising, by weight, (1) 100 parts of a complex epoxide resin having a melting point below 76° C. and comprising a polyether derivative of a polyhydric organic compound containing epoxy groups, (2) from 80 to 120 parts polyvinyl chloride, (3) from 8 to 50 parts di-(2-ethylbuty) phthalate, (4) from 3 to 10 parts antimony trioxide, (5) from 7 to 12 parts of a curing agent for (1) selected from the class consisting of diethylene triamine and m-phenylene diamine and (6) from 5 to 15 parts tricresyl phosphate.

3. An insulated conductor containing (A) as outer insulation therefor a mixture of ingredients cured in the presence of a suitable curing agent under the influence of heat and comprising, by weight, (1) 100 parts of a complex epoxide resin having a melting point below 76° C. and comprising a polyether derivative of a polyhydric organic compound containing epoxy groups, (2) from 80 to 120 parts polyvinyl chloride, (3) from 8 to 50 parts di-(2-ethylbutyl) phthalate, (4) from 3 to 10 parts antimony trioxide, (5) from 7 to 12 parts of a suitable curing agent for (1) and (6) from 5 to 15 parts tricresyl phosphate, (B) there being interposed in intimate contact with both the metallic conductor and the inner surface of the insulation a film of a conducting paint.

4. The process for preparing an insulated conductor having good dissipation factors at both room temperature and at 100° C., which process comprises (a) coating the said conductor with a conducting paint, (b) depositing as insulation around the said coated conductor a mixture of ingredients comprising, by weight, (1) 100 parts of a complex epoxide resin having a melting point below 76° C. and comprising a polyether derivative of a polyhydric organic compound containing epoxy groups, (2) from 80 to 120 parts of a vinyl chloride resin selected from the class consisting of polyvinyl chloride and copolymers of vinyl chloride and vinyl acetate, (3) from 8 to 50 parts di-(2-ethylbutyl) phthalate, and (4) from 3 to 10 parts antimony trioxide, together with a suitable curing agent for (1), and (c) thereafter heating the entire assembly at elevated temperatures to effect transfer of the conducting film from the surface of the conductor to the inner surface of the encapsulating insulation while at the same time effecting cure of the resinous insulation.

5. The process for preparing an insulated bus bar having good dissipation factor at both room temperature and at 100° C., which process comprises (a) coating the said bus bar with a conducting paint, (b) depositing as insulation around the said coated bus bar a mixture of ingredients comprising, by weight, (1) 100 parts of a complex epoxide resin having a melting point below 76° C. and comprising a polyether derivative of a polyhydric organic compound containing epoxy groups, (2) from 80 to 120 parts polyvinyl chloride, (3) from 8 to 50 parts di-(2-ethylbutyl) phthalate, (4) from 3 to 10 parts antimony trioxide, (5) from 7 to 12 parts of a curing agent for (1) selected from the class consisting of diethylene triamine and m-phenylene diamine and (6) from 5 to 15 parts tricresyl phosphate, and (c) thereafter heating the entire assembly at elevated temperatures to effect transfer of the conducting film from the surface of the bus bar to the inner surfaces of the encapsulating insulation while at the same time effecting cure of the resinous insulation.

6. A composition of matter comprising, by weight, (1) 100 parts of a complex epoxide resin having a melting point below 76° C. and comprising a polyether derivative of a polyhydric organic compound containing epoxy groups, (2) from 80 to 120 parts of a vinyl chloride resin selected from the class consisting of polyvinyl chloride and copolymers of vinyl chloride and vinyl acetate, (3) from 8 to 50 parts di-(2-ethylbutyl) phthalate, and (4) from 3 to 10 parts antimony trioxide.

7. A composition of matter as in claim 1 in which there is present a curing agent for the complex epoxide resin selected from the class consisting of diethylene triamine and m-phenylene diamine.

8. A composition of matter comprising, by weight, (1) 100 parts of a complex epoxide resin having a melting point 76° C. and comprising a polyether derivative of a polyhydric organic compound containing epoxy groups, (2) from 80 to 120 parts polyvinyl chloride, (3) from 8 to 50 parts di-(2-ethylbutyl) phthalate, (4) from 3 to 10 parts antimony trioxide, (5) from 7 to 12 parts of a curing agent for (1) selected from the class consisting of diethylene triamine and m-phenylene diamine, and (6) from 5 to 15 parts tricresyl phosphate.

References Cited in the file of this patent

UNITED STATES PATENTS

| Number | Name | Date |
|---|---|---|
| 2,476,993 | Milton et al. | July 26, 1949 |
| 2,480,298 | Happoldt | Aug. 30, 1949 |
| 2,512,996 | Bixler | June 27, 1950 |
| 2,593,922 | Robinson et al. | Apr. 22, 1952 |
| 2,658,880 | Landau | Nov. 10, 1953 |
| 2,682,515 | Naps | June 29, 1954 |